(12) United States Patent
Connelly et al.

(10) Patent No.: US 7,376,733 B2
(45) Date of Patent: May 20, 2008

(54) METHOD AND APPARATUS AND PROGRAM FOR SCHEDULING AND EXECUTING EVENTS IN REAL TIME OVER A NETWORK

(75) Inventors: Jon Christopher Connelly, Fort Collins, CO (US); Dian Hansen, Fort Collins, CO (US); Robert Glenn Shurtleff, III, Drake, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/357,092

(22) Filed: Feb. 3, 2003

(65) Prior Publication Data

US 2004/0177108 A1 Sep. 9, 2004

(51) Int. Cl.
*G06F 15/173* (2006.01)
*G06F 15/16* (2006.01)
*G06F 13/00* (2006.01)

(52) U.S. Cl. ................. 709/224; 709/201; 709/223; 719/318

(58) Field of Classification Search ............... 709/201, 709/223, 224; 719/318; 705/8, 9; 726/25
See application file for complete search history.

(56) References Cited

U.S. PATENT DOCUMENTS 6,363,421 B2* 3/2002 Barker et al. ............... 709/223
6,408,324 B1* 6/2002 Wallace et al. ............. 718/107
6,792,469 B1* 9/2004 Callahan et al. ............ 709/231
6,810,503 B1* 10/2004 David et al. ............. 715/500.1
2002/0016729 A1* 2/2002 Breitenbach et al. .......... 705/9
2002/0019844 A1* 2/2002 Kurowski et al. .......... 709/201
2003/0009696 A1* 1/2003 Bunker et al. ............. 713/201
2003/0056116 A1* 3/2003 Bunker et al. ............. 713/201
2003/0144894 A1* 7/2003 Robertson et al. ............ 705/8
2004/0039804 A1* 2/2004 Carr et al. ................. 709/223

* cited by examiner

*Primary Examiner*—Saleh Najjar
*Assistant Examiner*—V. Korobov

(57) ABSTRACT

The present invention relates to a method, system, computer program product, or apparatus that schedules and executes events within a network in real-time. An event processor contacts one or more event schedulers, and it receives back from them event schedule updates. It then calculates the time when each event is to occur from information contained in the received scheduling information for each event. Next, it places event scheduling information contained in the received scheduling information for each event, plus the calculated occurrence time of the corresponding event, into an event queue. Finally, at the time when each event is to occur, as indicated by examination of the calculated times in the event queue, the event processor sends out event firing messages to event processors that are named in the received scheduling information for each event.

25 Claims, 7 Drawing Sheets

METHOD AND APPARATUS AND PROGRAM FOR SCHEDULING AND EXECUTING EVENTS IN REAL TIME OVER A NETWORK

BACKGROUND OF THE INVENTION

1. Field of the Invention

This invention relates generally to the field of event scheduling, and more particularly to a method, system, computer program product and apparatus for scheduling and executing events in real-time in a web environment and in similar environments.

2. Description of the Related Art

Systems today that feature event scheduling and triggering or firing require that an event be processed at a specific point in time throughout several computer applications. Some operating systems and programming languages have mechanisms that can schedule and trigger or fire such events and notify or launch software tasks when the event time arrives. All of these processes are machine specific in that the objects or tasks that are to be called back generally lie within the physical and unique environment of a particular machine. The callback or notification is always directly back to the process that has scheduled the event. If the scheduler on such a machine is currently busy or has become too busy to take on any additional workload, a newly scheduled event may not be handled properly.

There are several problems with such traditional event handling systems. First, they are not sufficiently and reliably available. Since the whole event scheduling and processing system is contained within a single machine, if that machine were to go off-line or down for any reason, then all of the event scheduling and processing is terminated until that machine is brought back online. Secondly, they are not readily scalable. If an increase in demand occurs beyond the capabilities of an individual machine, the entire machine may have to be replaced. And third, such systems are specific to particular operating systems having specific timers and schedulers and accordingly are not uniform over an enterprise that includes different types of machines having different operation systems.

SUMMARY OF THE INVENTION

Briefly summarized, an embodiment of the present invention is directed to a method, system, computer program product, or apparatus that schedules and executes events within a network in real-time. An event processor contacts one or more event schedulers, and it receives back from them event schedule updates. It then calculates the time when each event is to occur from information contained in the received scheduling information for each event. Next, it places event scheduling information contained in the received scheduling information for each event, plus the calculated occurrence time of the corresponding event, into an event queue. Finally, at the time when each event is to occur, as indicated by examination of the calculated times in the event queue, the event processor sends out event firing messages to event processors that are named in the received scheduling information for each event.

DETAILED DESCRIPTION OF THE PREFERRED EMBODIMENTS

The present invention provides a method for scheduling and executing events in real-time.

In the world of the Internet and of intranets and other LAN environments, event schedulers must always be able to fire (or trigger or launch) real-time events at the times and on the days when such events are supposed to be fired or triggered. One cannot rely upon any given single machine to serve as an event scheduler, since any one machine can always fail at just the wrong time.

Figure 1:
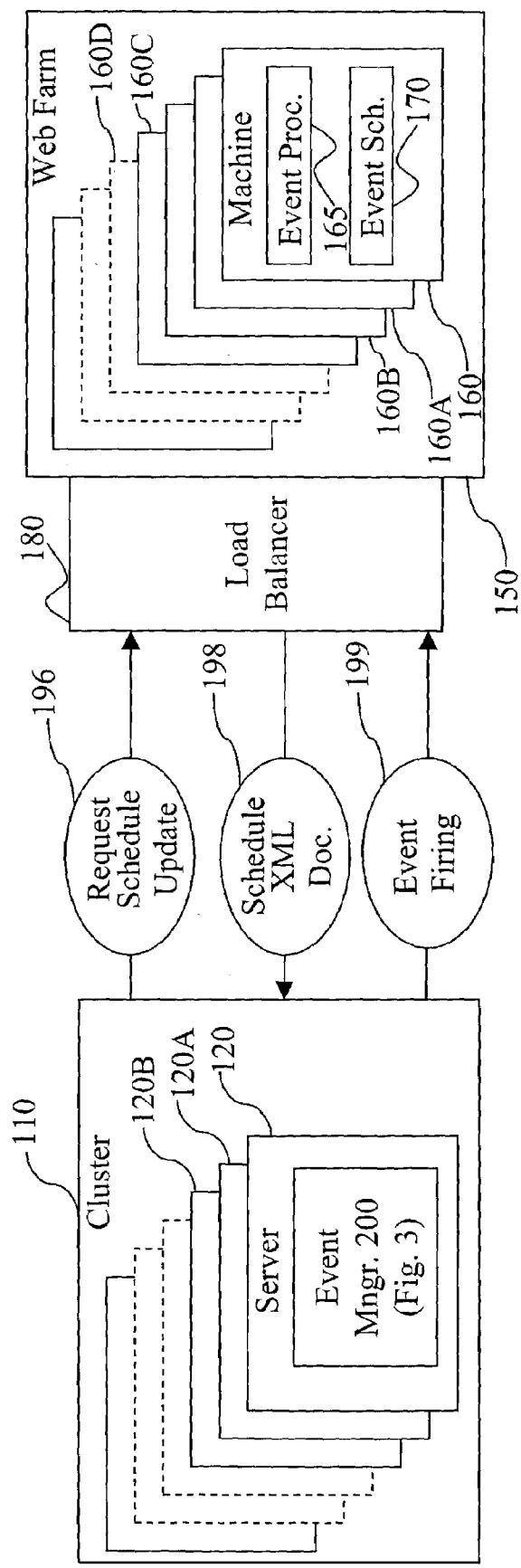
FIG. 1 is a block diagram illustrating, in overview fashion, system components and key messages exchanged in a method and apparatus according to an embodiment of the present invention.

FIG. 1 presents a block diagram illustrating in overview the system components that are used in one embodiment of the present invention. In this illustrative embodiment, the invention accomplishes its goals by abstracting and separating the event scheduling process (the process of scheduling an event to occur at some future time or on some future date) and the event processing process (the process of actually firing an event) from the event management process (the process of managing numerous scheduled events and initiating their firing at the proper times on the proper days).

Accordingly, and with reference to FIG. 1, this embodiment of the invention comprises event schedulers 170, event processors 165, and event managers 200.

The event schedulers 170 can be any programs that are designed such that they can set up and then maintain a properly formatted event scheduling request, containing schedules for one or more events. This request is associated with a url address, thus making it possible for the request to be addressed and retrieved by an event manager 200. In one embodiment, these event scheduling requests are XML documents which, in the discussion that follows and in the drawings, are called "schedule XML documents 198." Such a document 198 defines, in the XML language, one or more events, when they are supposed to occur, and what commands and data are to be sent to what URL address to cause the event to occur at a later scheduled time (see the example presented in Appendix B).

Within such a document, all of the event schedules are bracketed with the XML tags "<schedules>" and "</schedules>". Each scheduled event is bracketed with the XML tags "<schedule>" and "</schedule>". Within these brackets, there appear at least four data fields similarly bracketed (as illustrated in Appendix B): an "id" field uniquely identifying an event schedule; a "resolution" field containing actual instructions on when the event is to occur; a "data" field containing any data relevant to the event; and a "url"

field containing the address of any application (called an "event processor 165") that is to be called, and to which the "data" and other information is to be passed, to cause the event to be fired.

The "resolution" field is formatted as five numbers separated by semicolons. Collectively, they specify when an event is to occur. The first number signifies the time in minutes; the second number signifies the time in hours; the third specifies the date in days; the fourth specifies the month; and the fifth specifies the day of the week. Any field containing an asterisk means "every hour" or "every day" and so on. Several numbers may occupy any position, separated by commas, and these each signify the timing of a separate event. Thus, "0;5;*;*;*" signifies that the "event" is to be "fired" at 5:00 every day. "0,15,30,45;*;*;*;*" signifies that the "event" is to occur every 15 minutes.

The event managers 200 periodically and systematically retrieve all of the schedule XML documents 198 and then manage their scheduled events, canceling any events whose schedules are removed from these documents 198 and scheduling any new events whose schedules are added to these documents 198.

When it is time for any given scheduled event to occur, an event manager 200 sends an HTTP or a SOAP event firing message 199 to an event scheduler 170 (see Appendix A for a simple example of such an event scheduler program). The firing message 199 for an event is simply a message that is addressed to the URL specified in the corresponding event's scheduling request. The firing message 199 also includes the name assigned to the event and the data specified in the event's scheduling request. Here is a simple example of such a message:

"isee-configuration.ati.hp.com?id=app&data=&time=20020925142308"

In this example, the event processor is a web application having the above address as its URL or address. This web application is passed the above message that specifies: the "name" of the event is "app," the "data" field is empty, and the time of the event field "time" is the time when the event was scheduled to occur, formatted as "yyyymmddhhmmss".

In FIG. 1, a scalable and high-availability cluster 110 of mirrored servers 120, 120A, 120B, etc. is shown. These servers back each other up. If a primary or active server fails, the next available server in line takes over the tasks of the failed server. The clustering technology monitors individual processes and restarts them should they be terminated unexpectedly. These servers 120 each contain an event manager 200 that can manage the scheduling of events. Having such a high reliability cluster 110 serve as the home of these event managers 200 provides insurance that at least one or more of the servers 120, 120A, etc. within the cluster 110 will always up and running and able to preserve the integrity of all event scheduling and firing activities. For example, if the server 120 becomes non-functional, the server 120A automatically takes over all the event scheduling responsibilities of the server 120, and so on. The cluster 110 is also scalable, meaning additional servers can be easily added as required to match increased system loads. In addition, multiple clusters 110 can be joined together to meet scalability requirements as the demand for services may warrant.

The event managers 200 are multi-threaded, real-time event schedule management and event firing programs. In this embodiment, the event managers 200 are written in Java, and this enables the event managers 200 to be run on virtually any machine having a compliant Java Virtual Machine (JVM) system installed. This use of Java also provides operating system neutrality. Of course, the event manager 200 may be written in any language that supports the event manager 200's methodology and functions.

In addition to being machine and operating system independent, the event managers 200 are also time keeping independent. They are constructed from multiple threads linked by shared data queues in a way that provides excellent real-time responses in the face of heavy event scheduling loads without danger of task interference or lockup. This avoids and prevents any use of or dependency upon operating system specific timers and schedulers and the like. The event managers 200 thus have the inherent ability to operate in real time. They can contact the event processors 170 and handle any communication delays that may arise without in the least hindering their ability simultaneously to do event scheduling and event management. And in addition to working through special event processors 170 to trigger events, the event managers 200 are also able to call back to any HTTP URI address, passing to that address any necessary commands, regardless of the source of the events. They are aware continuously of the current date and time, of the scheduled events, of the timing of the next event that is to be fired, and of what system or entity is to be contacted when an event is to be fired.

Referring to FIG. 1, that figure also discloses a typical web farm 150 which includes one or two or more machines 160, 160A, 160B, etc. In such a web farm, each machine 160 is treated as identical to the others, regardless of the quantity or type of machines that exist within the web farm. There may be just a few, hundreds, or even thousands of machines within any given web farm, depending upon how loaded down the web farm is with work.

Each of the machines 160, 160A, etc. includes a copy of the event processor 165 and event scheduler 170. As explained above, any event scheduler 170 may schedule an event with an event manager 200 within the cluster 110. When the scheduled time for that event arrives, an event manager 200 sends an event-firing message 199 to an event processor 165, which then triggers the event.

The event schedulers 170 and event processors 165 are also operating system independent, highly scalable, and dependably available due to the nature of web farms. The web farm 150 normally has multiple identical machines 160, 160A, 160B, etc. grouped together and backing each other up. Any one machine is capable of sending and receiving any HTTP or SOAP request. A load balancer 180 receives all communications intended for any one of the machines 160, 160A, etc. within the web farm 150 and then appropriately distributes the communications based upon machine availability and capacity evenly to distribute the incoming load of communications among the various machines. If any given machine happens to be off-line or out of service at any point in time, the other machines automatically receive the incoming communications in its place. As increased demand creates a burden on the existing machines, additional clone machines may simply be added to the web farm and registered with the load balancer 180. With respect to web traffic, the event schedulers 170 and event processors 165 may be treated as stateless and asynchronous entities. They handle HTTP or SOAP requests easily, since these requests may be routed to and from any of the machines 160, 160A, etc. within the web farm 150. This guarantees that schedule XML documents 198 and event firing messages 199 will always be sent and received and otherwise handled in a timely manner approaching real-time. Event schedulers 170 and event processors 165 may co-exist on the same machines within the web farm 150.

Figure 3:
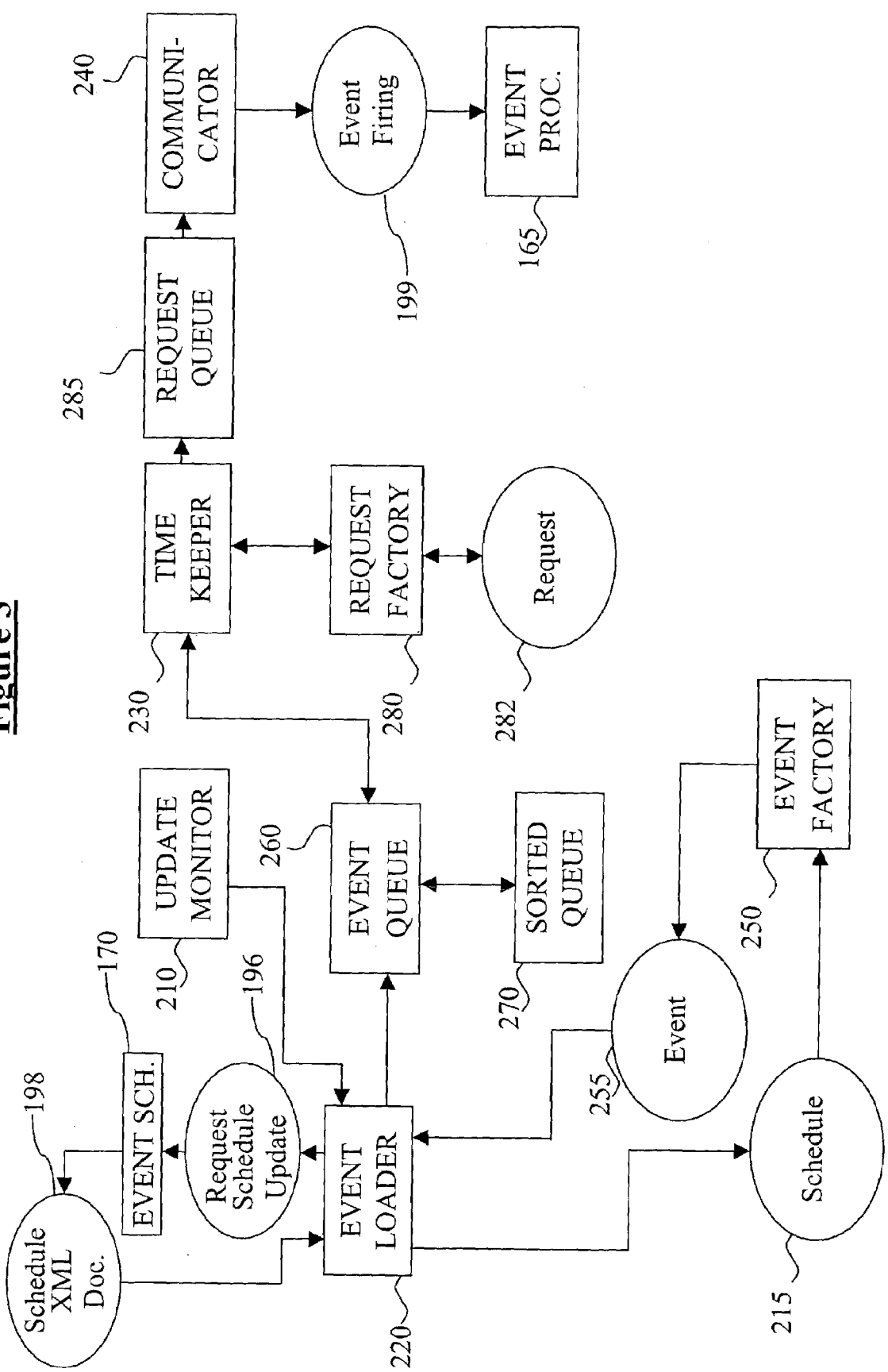
FIG. 3 is a block diagram illustrating the details of an event manager according to an embodiment of the present invention.

In one embodiment, the event managers 200 are programmed to send out request schedule update messages 196 periodically. In response, any of the addressed event schedulers 170 may return to the event managers 200 a schedule XML document 198 containing one or more individual event schedules 215 (FIG. 3). In another embodiment, the event schedulers 170 can send a schedule XML document 198 to an event manager 200 at any time, without waiting to be polled. These two embodiments may also be combined.

Figure 2:
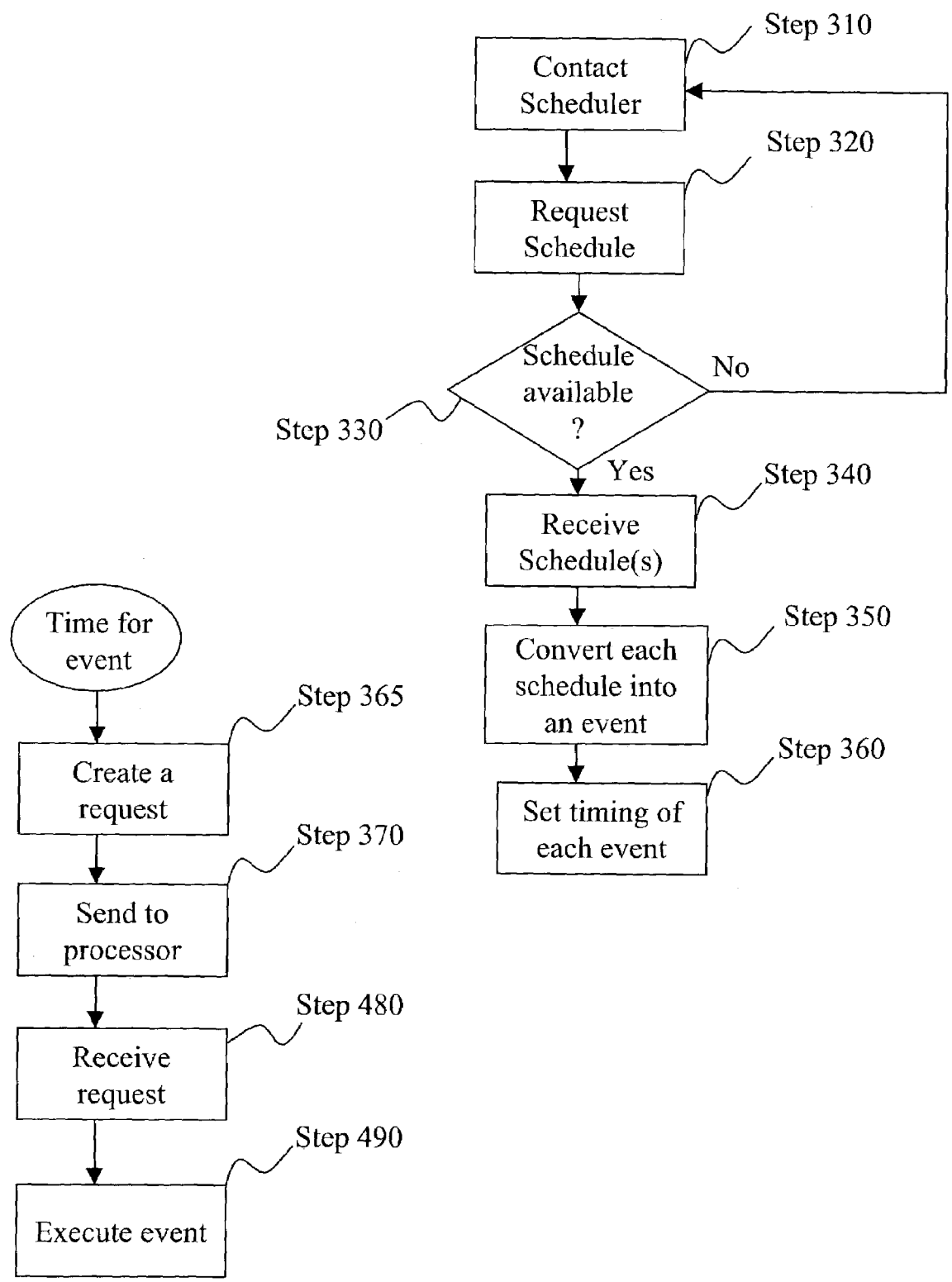
FIG. 2 is a flow chart illustrating, again in overview fashion, method steps according to an embodiment of the present invention.

FIG. 2 presents a flow chart illustrating in overview the method steps carried out by an embodiment of the present invention. The event manager 200 initiates scheduling by periodically polling the event schedulers 170 (step 310). The event manager 200 does this by sending out request schedule update messages 196 to each event scheduler 170. These messages 196 request the event schedulers 170 to return schedule XML documents 198 each defining one or more events that are to be scheduled (step 320). If no such documents 198 are returned (step 330), then the event manager 200 returns to step 310 and continues to poll the event schedulers 170. But if one or more such schedule XML documents 198 are returned to an event manager 200, then that event manager receives the event schedules 215 (FIG. 3) from within the received documents 198 (step 340), transforms each such event schedule 215 into what are called event objects 255 (FIG. 3—step 350 in FIG. 2), and then sets the timing within each event object to the scheduled time of occurrence of the corresponding event (step 360). The event objects 255 are then placed into an event queue 260 (FIG. 3), and the event objects 255 within the event queue 260 are then sorted according to their assigned times, as will be explained more fully below.

The event queue 260 (FIG. 3) is continuously monitored. When the scheduled time for an event arrives, at step 365 a request 282 (FIG. 3) for the triggering of the event is generated and is placed into a request queue 285 (FIG. 3). At step 370, the request is used to generate an event-firing message 199 which is sent across to an event processor 165 (step 370). Thus, an event processor 165 receives the event-firing message 199 (step 480). At step 490, the event is finally fired on one of the machines 160, 160A, etc. within the web farm 150. The request queue 285 is continuously monitored for the presence additional upcoming event firing requests.

FIG. 3 is a block diagram which illustrates the structural and program details of the event manager 200 (first introduced in FIG. 1) according to one embodiment of the invention. In FIG. 3, all of the event manager 200 elements have been assigned reference numbers that fall within the range of 210 to 285. Other elements shown in FIG. 3 all have reference numbers that fall within the range of 165 to 199. These are elements that originated in FIG. 1 and that are included in FIG. 3 to illustrate how the event manager 200 communicates with the other system elements.

FIG. 3 describes the event manager 200 at a medium level of detail. More detailed descriptions of the event manager 200's four principal software layers can be found in FIGS. 4 to 7, which are described below.

With reference to FIG. 3, the event manager 200 comprises four distinct software layers including an update monitor 210, an event loader 220, a timekeeper 230, and a communicator 240. The event manager 200 further comprises five significant data structures including those of: event objects 255, an event queue 260 (containing event objects), a sorted event queue 270 (also containing event objects), request objects 282, and a request queue 285 (containing request objects).

Each layer runs its own thread. The update monitor 210 is a thread that is driven by some form of system clock (not shown) and that periodically triggers the operation of the event loader 220 to request event schedules 215 from the event schedulers 196 and to convert them into event objects 255. The remaining three layers or threads each communicates with the next layer or thread by means of asynchronous synchronized queues. The event loader 220 places the event objects 255 it generates into the event queue 260; and the time keeper 230 fetches these event objects 244 from this same event queue 260 when it is time to trigger the corresponding events. Likewise, the time keeper transforms these event objects 255 into record objects 282 and then places the record objects 282 into the request queue 285; and the communicator 240 fetches these request objects 282 from this same request queue 285 and sends them out, in the form of event firing messages 199, to the event processors 165. This use of asynchronous queues to control the operation of the threads provides many beneficial features to the process of inter-thread communications, including virtual elimination of any deadlocks, virtual elimination of any races, and virtual elimination of complex critical sections and critical section management without the need for any significant services obtained from a proprietary local operating system.

The event manager 200 functions in the following manner: The update monitor 210 thread, placed into operation periodically by some form of system clock (not shown), periodically triggers the event loader 220 thread to contact the event schedulers 170 to request the submission of event schedules. As shown in FIG. 3, the event loader broadcasts a request schedule update message 196 to the event schedulers 170. Any event scheduler 170 having one or more events to schedule responds by sending back a schedule XML document 198 containing one or more schedules of events that are to be triggered at some future time. These schedules may define one-time-only events or they may define periodically repeated events, in which case the event schedule may be triggered for removal from the event queue 260 by a later schedule XML document containing an event schedule removal request. In one embodiment, these event schedules and any event removal schedules are submitted in XML format, as is illustrated in Appendix B. However, this is not a limiting factor of the invention. The documents can be in any format that otherwise complies with the limitations of the present invention.

The event loader 220 is responsible for accepting and establishing within the event queue 260 all newly scheduled events and their schedules and also for retrieving from the event queue 280 all previously received and scheduled events and their schedules if and when those events are cancelled. The event loader 220 can accept event-defining schedules 225 from all of an enterprise's event schedulers 170 which are directed to use one of the event managers 200 within the cluster 110. To schedule an event, an event scheduler 170 responds to a request schedule update message 196 by returning one or more schedule XML documents 198 (see Appendix B) each of which may define one or more schedules 215 for one or more events. In response to receipt of such a message 196, the event loader 220 removes from each incoming schedule XML document 198 each of the one or more schedules 215 (each schedule, as is shown in Appendix B is bracketed by the XML tags "<schedule>" and "</schedule>") and then sends the schedules 215, one-at-a-time, to an event factory subroutine 250 which transforms each schedule 215 into an event object 255 suitable for submission to and inclusion within the event queue 260. Each time the event factory 250 returns an event object 255 to the event loader 220, the event loader passes the event object 255 along to the event queue 260.

Each event object 255 is a representation of a schedule 215 element that was submitted as part of a schedule XML document 198. The event objects 255 are formatted by the event factory 250 to be compatible with the structure of the event queue 260.

Each event object 255 comprises at least three fields: an event resolution field, which defines when (daily, weekly, etc.) an event should occur periodically; an actually scheduled time of occurrence field, which contains the actual time when the next occurrence of an event is scheduled to occur; and an HTTP or SOAP address and command field. The resolution field contains the actual schedule for when the event is to be periodically triggered (daily, weekly, monthly, etc.). The actually scheduled time field specifies the next real time when and date upon which an event is to be triggered. This value is generated by the event factory 250 or by the event loader 220, which compares the resolution field contents to the current time and date to generate this value. This value is needed later on, as will be explained. The HTTP or SOAP address and command field contains command information that is ultimately passed on to the event processor 165 residing at the indicated address when an event processor 165 is to fire the event. Or it may specify the address of some other web entity that is to fire the event in accordance with the supplied command information.

The event objects 255 will also likely contain other fields needed for the establishment of the pointers that link these objects 255 into trees, linear linkages, or the like as part of the event queue 260 structure to facilitate comparing and sorting and reorganizing the queued objects.

Briefly summarized, the event loader 220 requests and accepts schedule XML documents 198, extracts from them event schedules 215, transforms these event schedules 215 into event objects 255 with the assistance of an event factory 250, and then places the resulting event objects 255 into the event queue 260:

The event queue 260 is a subclass of a sorted queue 270 established through the use of delegation. The sorted queue 270 is an asynchronous access priority queue that sorts itself automatically. The sorted queue 270 uses the Java Tree Map class for its delegate implementation. Prioritization is based upon the Java Comparable interface. Sorting is based upon the results of an object comparison method call which returns a negative integer, zero, or a positive integer in accordance with whether a given event object 215's actually scheduled time of event occurrence field within the queues 260 and 270 contains a time and date that is less than, equal to, or greater than that of another event object 215. Enqueue and dequeue methods are provided and are carefully synchronized to provide for inter-thread safety.

The sorted queue 270, through its use of the Tree Map class, provides adequate sorting performance to handle many thousands of event objects. When a new event object 255 is placed into the event queue 260 and is then placed into the Tree Map, it is automatically sorted and inserted at the correct point in time within the queue 270 such that the event object is sorted into its proper position on the average in a time that is proportional to the logarithm of the number of objects already present within the queues 260 and 270.

As has been explained, the update monitor 210 periodically triggers the event loader 220 and thus causes the event loader 220 to re-synchronize the event objects 255 contained within the event queue 260 with the demands of the event schedulers 170. The update monitor 210 manages the update frequency for each of the event schedulers 170. At each determined update frequency, the update monitor 210 updates the event queue 260 with the current events required by each event scheduler 170.

The timekeeper 230 monitors the real time of day and the real date, and it compares this time and date information to that contained in the actually scheduled time of event occurrence field of the event object 255 at the head end of the event queue 260. When this event object 255's scheduled event time (or time and date) in the event queue 260 coincides with or falls behind the current real time, then the timekeeper 230 dequeues the event object 255 from the head end of the event queue 260, obtains a request object 282 from a request factory 280 corresponding to this event, and places the request object 282 into the request queue 280. The timekeeper 230 then re-calculates the event's next scheduled event time (and possibly date) of occurrence and places the event object 255 back into the event queue 260. (Event objects 255 for one-time events are simply discarded at this point.) Sorting within the queue 260 is then done automatically, as has been described.

The request object 282 comprises at least one field: an HTTP or SOAP address and command field. It may also contain other fields required for management of the request queue 285.

This one field contains the event call-back information that is needed to notify the originating system that the event's time (or time and date) has come due. A particular request object 282 is directly correlated to a particular individual event. The request object is placed into the request queue 285, a standard asynchronous FIFO (First In First Out) queue. The enqueue and dequeue methods are again synchronized to provide inter-thread safety.

The communicator 240 continuously monitors the request queue 285 for requests that need to be returned to the indicated URL address of an event processor 165 or other web entity. When a request 282 is found to be present within the request queue 285, the communicator 240 detects the request 282 and immediately removes it from the request queue 285. The communicator 240 then reconstructs the actual HTTP or SOAP address and command (if any). The communicator 240 then contacts that address, sending all the command parameters, and awaits confirmation of its successful transmission. The request 282 is discarded once confirmation is received that the URL has arrived safely at its destination. The communicator 240 simply dequeues the requests 282 out of the request queue 285 in the same order in which they were originally placed into the queue 285 (FIFO).

The following is an example of an application event flow:
The event loader 220, triggered periodically by the update monitor 210, contacts the event schedulers 170 and obtains the schedule XML documents 198.
The event factory 250 creates an event object 255 for each schedule 215 found within each schedule XML document 198 and enables the event loader 220 to place the event object 255 into the event queue 260.
The event queue 260, which is part of the sorted queue 270, automatically sorts the event objects 255 in order by their next scheduled time or time and date of event occurrence.
The timekeeper 230 continuously monitors the event queue 260.
When the first event object 255 in the sorted event queue 260 becomes due (the next scheduled time corresponds to the current system time), the time keeper 230
Creates a request 282 for the currently due event
Queues this request 282 in the request queue 285

Has the event calculate its own next scheduled time
Puts the event object 255 back into the event queue 260 where it is once again automatically sorted into the correct position.

The communicator 240 continuously monitors the request queue 285. Whenever there is a request in the queue it
Dequeues the request 282
Assembles the event's URL and contacts the URL for the request, telling the recipient that the event has become due and should be processed, and passing along any parameters.

The update monitor 210, event loader 220, timekeeper 230, and communicator 240 all run within their own asynchronous threads simultaneously. There is no timing dependency between them, which prevents any deadlock and race conditions from arising between them.

Figure 4:
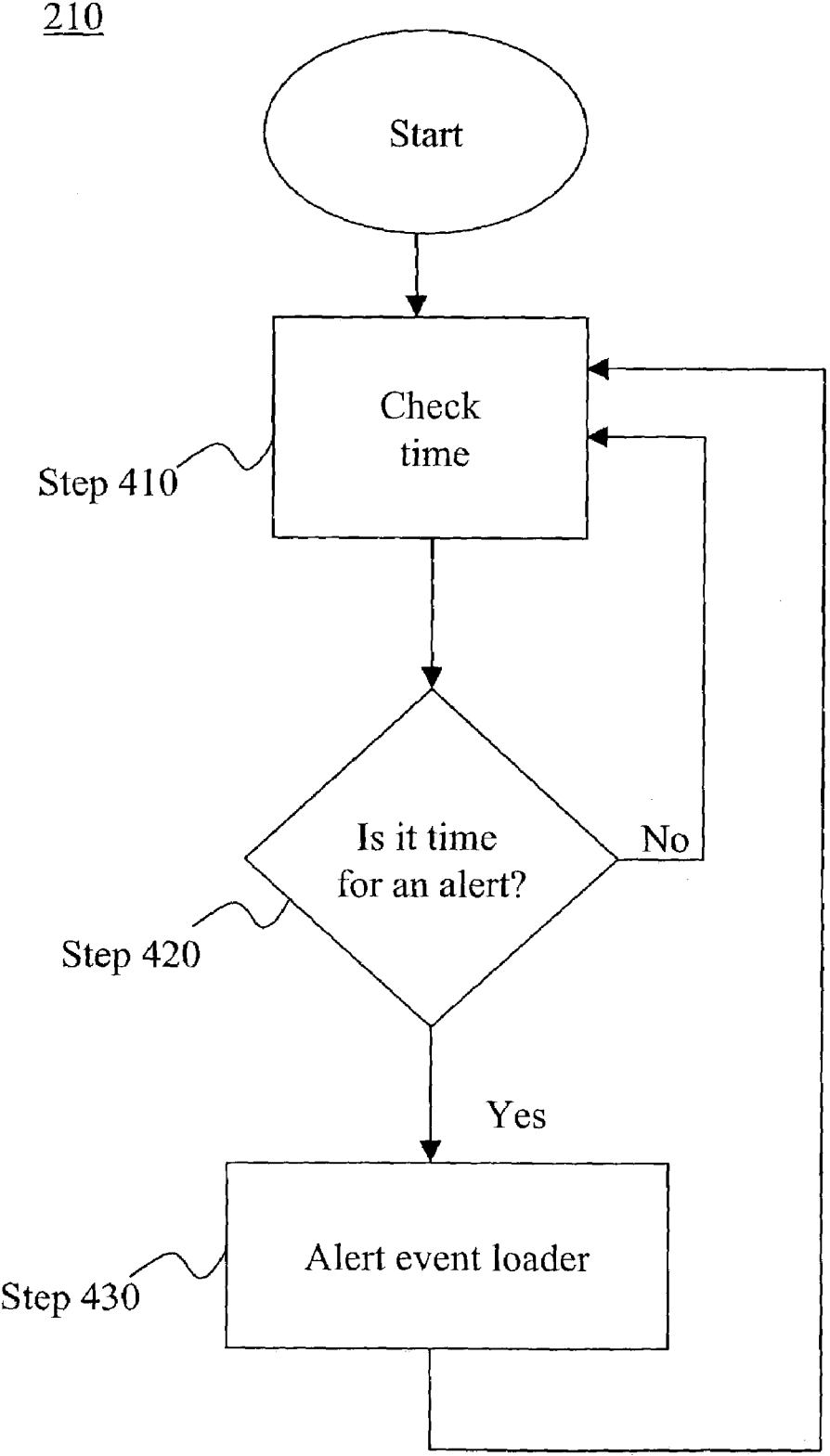
FIG. 4 is a flow chart illustrating the details of an update monitor thread according to an embodiment of the present invention.

FIG. 4 presents a flow chart illustrating details of the update monitor 210 thread. The update monitor 210 periodically checks the time at step 410. If it is time for an alert at step 420, it triggers the event loader 220 at step 430. If it is not time for an alert, then program control returns to the step 410. The process is a continuous loop.

Figure 5:
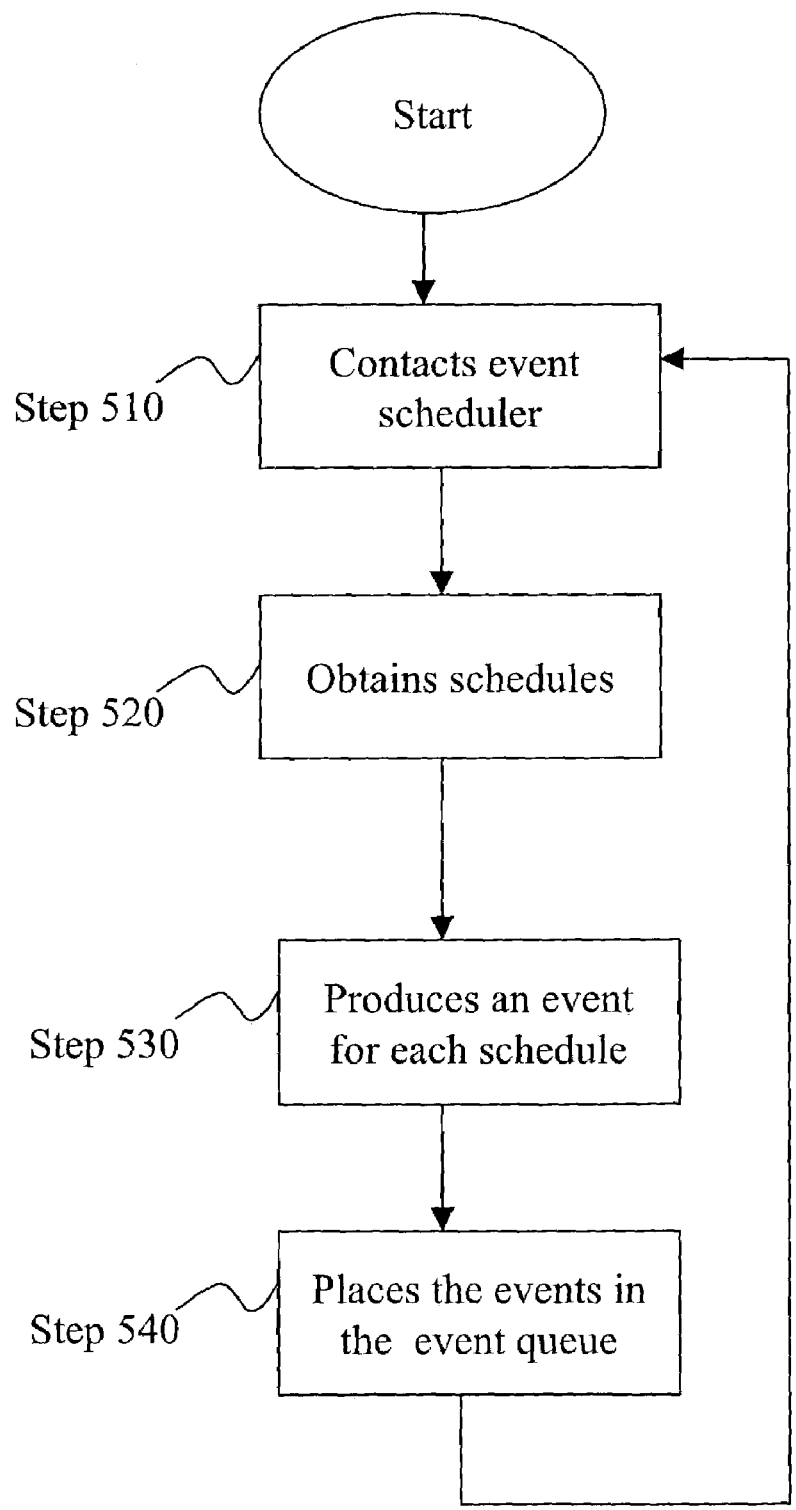
FIG. 5 is a flow chart illustrating the details of an event loader thread according to an embodiment of the present invention.

FIG. 5 presents a flow chart illustrating details of the event loader 220 thread. At step 510, the event loader 220 thread contacts the event schedulers 170 and obtains schedule XML documents 198 at step 520. For each schedule 215 found within such a document 198, at step 530, an event object 255 is produced. At step 540, the event objects are placed into the event queue 260, and the process then repeats itself in a continuous loop.

Figure 6:
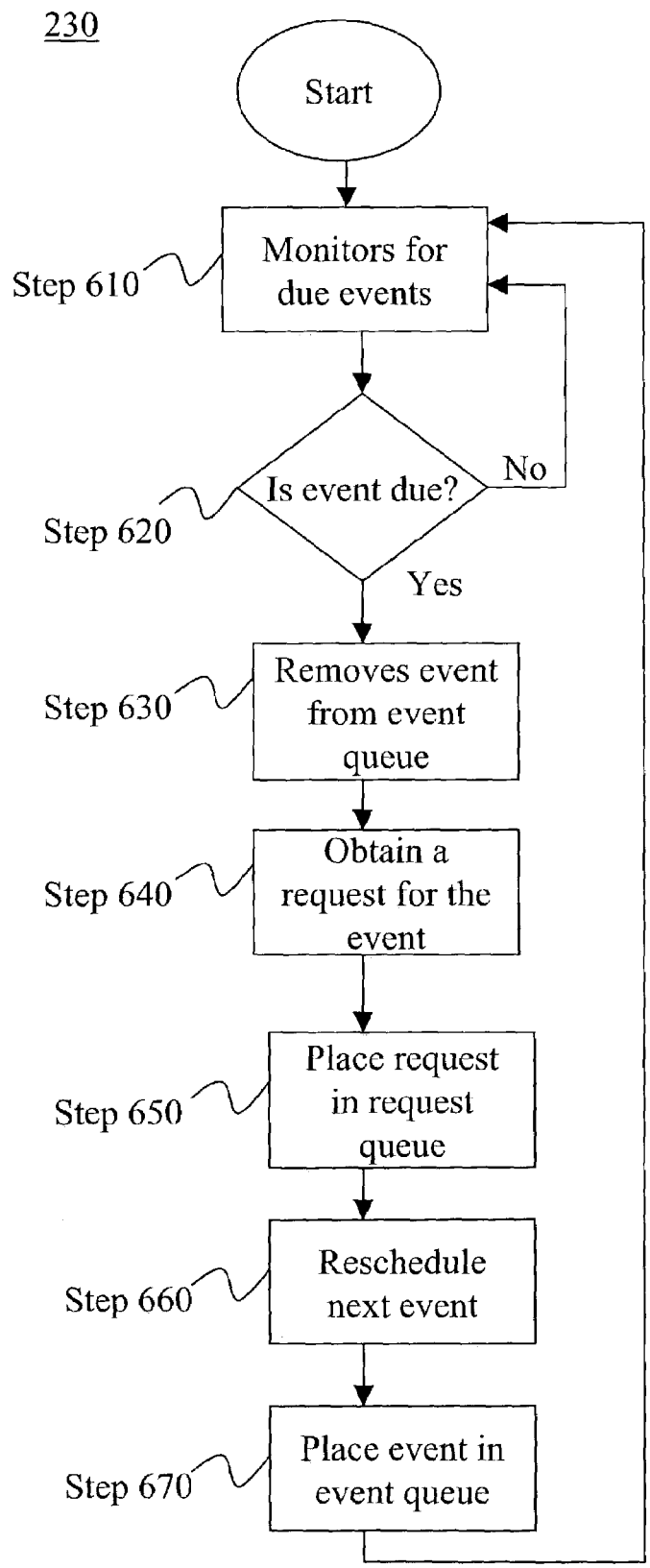
FIG. 6 is a flow chart illustrating the details of a time keeper thread according to an embodiment of the present invention.

FIG. 6 presents a flow chart illustrating details of the time keeper 230 thread. At step 610, the time keeper 230 is monitoring for any events that are due, as signaled by an event object 255 appearing at the output of the event queue 260 whose event time has arrived. If an event is not due at step 620, then the process goes back to step 610 and continues to monitor. If there is an event due at step 620, then at step 630, the corresponding event object 255 is removed from the event queue 260. At step 640, an event request 282 is obtained for that particular event; and then at step 650, the obtained request 282 is placed into the request queue 285. At step 660, the next event is rescheduled; and at step 670, the event object 255 for the event is returned to the event queue, with the time for the event updated. The process then goes back to step 610 and is a continuous loop.

Figure 7:
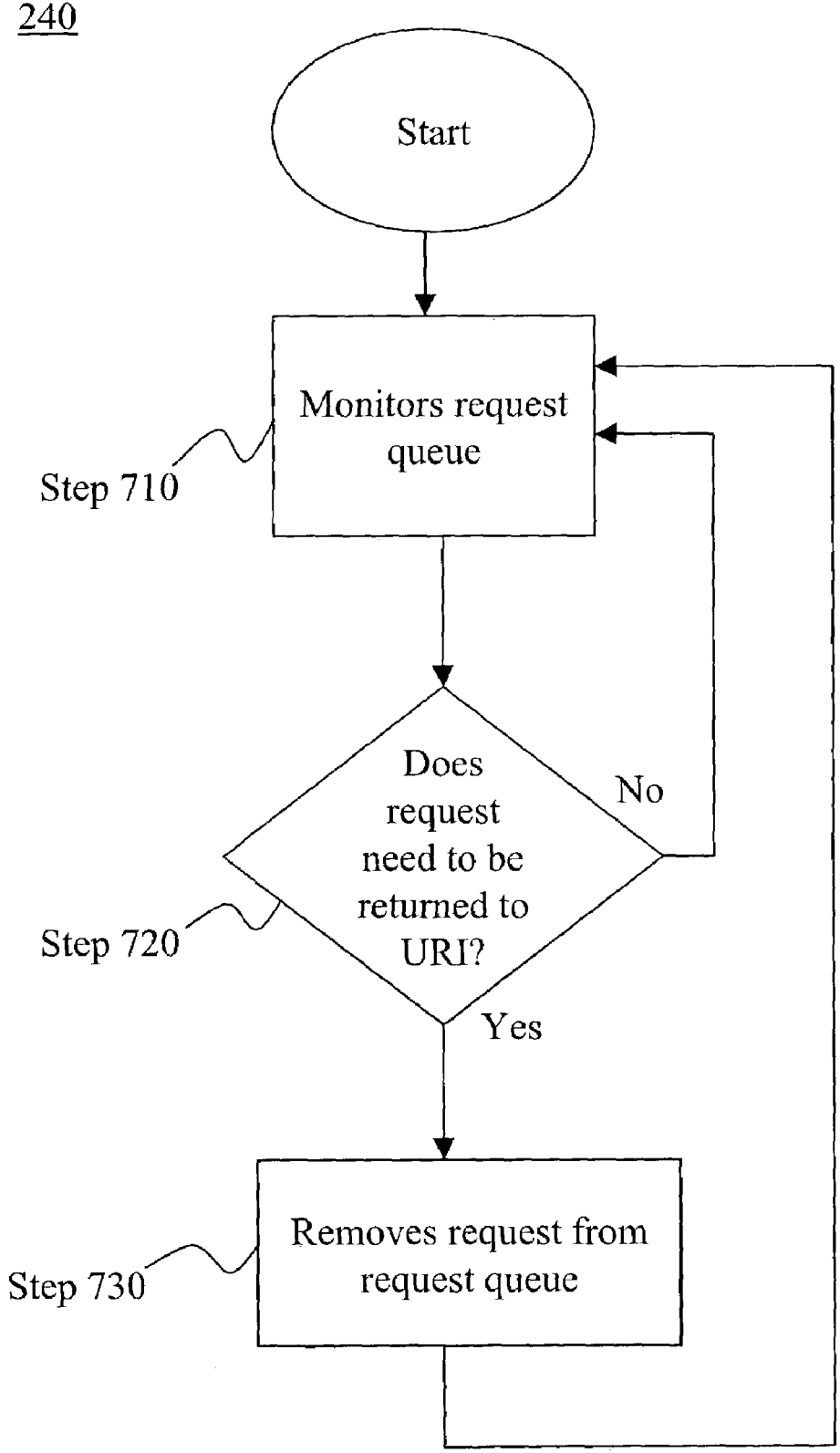
FIG. 7 is a flow chart illustrating the details of a communicator thread according to an embodiment of the present invention.

FIG. 7 is a flow chart illustrating details of the communicator 240 thread. At step 710, the request queue 285 is monitored. If no request is present, then the process goes back to step 710 and repeats. If a request object 282 is found and needs to be returned to its URL, then the request 282 is removed from the request queue 285 at step 730, its URL address is assembled, and any command parameters are sent off to the specified URL address to trigger the event. The process is a continuous loop and goes back to step 710.

Other embodiments of the present invention are apparent to those skilled in the art from a consideration of the specification and the practice of the invention disclosed therein. It is intended that the specification be considered as exemplary only with the true scope and spirit of the invention being indicated by the claims following Appendices A, B and C.

APPENDIX A

Embodiment of an Event Processor 165

```
[ Note - the line beginning " *** " is a continuation of the preceding line. ]
package com.hp.isee.partner.xp.heartbeat.analyzer;
// Logging imports
import org.apache.log4j.*;
// Standard imports
import java.io.PrintWriter;
import java.util.Enumeration;
import java.text.*;
import java.util.*;
// Struts imports
import org.apache.struts.action.*;
// ISEE imports
// XP imports
import com.hp.isee.partner.xp.heartbeat.*;
import com.hp.isee.partner.xp.heartbeat.analyzer.pool.*;
/******************************************************************
 * Provides the STRUTS Controller layer access into the HeartbeatValidator
 * Implements the STRUTS Controller layer Action. Provides the interface into
 * the HeartbeatValidator class and functionality.
 *///--------------------------------------------------------------
public class HeartbeatAnalyzerAction extends Action
{
            //===========================================================
            // Constants
            //-----------------------------------------------------------
            /** Used for internal configuration management */
            public final static String ident = "@ (#)$Header:
/xpresso/src/com/hp/isee/partner/xp/heartbeat/analyzer/HeartbeatAnalyzerAction.java 11 2002/04/25 13:08:57 −0600 roshur
                       *** $\n";
            /** Return code for received URL request and all parameters are complete and correct */
            private final static String ERRORCODE_SUCCESS = "1" ;
            /** Return code for received URL request and parameters are either incomplete and incorrect */
            private final static String ERRORCODE_INVALID_PARMS = "-1" ;
            //===========================================================
            // Data
            //-----------------------------------------------------------
```

APPENDIX A-continued

Embodiment of an Event Processor 165

```
            /** log4j log for this class */
            Category log = Category.getInstance( HeartbeatAnalyzerAction.class.getName( ) ) ;
            //==================================================================================
            // Constructors
            //----------------------------------------------------------------------
            /*************************************************************************
             * <constructor name>
             * <desc>
             * @param <name> <desc>
             * @param <name> <desc>
             * @exception <classname> <desc>
             *///----------------------------------------------------------------------
// no explicit constructors at this time
             * perform
* This is overridden from the Action.perform( ).
             * @see Action
             *
             * @param mapping ActionMapping
             * @param form ActionForm
             * @param request javax.servlet.http.HttpServletRequest
             * @param response javax.servlet.http.HttpServletResponse
             * @return org.apache.struts.action.ActionForward
             * @exception java.io.IOException
             * @exception javax.servlet.ServletException
             *///----------------------------------------------------------------------
            public ActionForward perform(ActionMapping mapping,
                        ActionForm form,
                        javax.servlet.http.HttpServletRequest request,
                        javax.servlet.http.HttpServletResponse response)
                  throws java.io.IOException,
                        javax.servlet.ServletException
            {
            StringBuffer sbOutput = new StringBuffer("") ;
                        log.debug("perform( ) has been called.");
                        HeartbeatQueryString qryStrings = new HeartbeatQueryString( request ) ;
                        // only pass control to Model if ALL data passed in
                        log.debug( "validating the query string parameters . . . ") ;
                        //[1] start
                        if( qryStrings.areValid( ) )
                        {
                                    // instantiate the analyzer
                                    HeartbeatAnalyzer analyzer = new HeartbeatAnalyzer( ) ;
                                    //bind down the parms
                                    analyzer.setId( qryStrings.getId( ) ) ;
                                    analyzer.setAppData( qryStrings.getAppData( ) ) ;
                                    analyzer.setScheduledEventTime( qryStrings.getEventTime( ) ) ;
                                    analyzer.setTestMode( qryStrings.getTestMode( ) ) ;
                                    // normal mode is NOT in test mode.
                                    if( ! qryStrings.getTestMode( ) )
                                    {
                                                // return success code to caller that we rcvd. call & parms are complete & correct
                                                sbOutput.append( this.ERRORCODE_SUCCESS) ;
                                                // in normal mode, we do not wait for the analysis
                                                log.debug( "Loading the analyzer into the ThreadPool." ) ;
                                                // just pass the analyzer to the thread pool to be processed
                                                AnalyzerThreadPool.instance( ).addAnalyzerTask( analyzer ) ;
                                    }
                                    else // test mode. No threading
                                    {
                                                returnQueryStringDebugInfo( request, sbOutput ) ;
                                                analyzer.run( ) ; // this will be a synch. run, waiting for its return. NON-threaded.
                                                sbOutput.append( analyzer.getTestResults( ) ) ; // continue to display debug info
                                    }
                        }
                        else
                        {
                                    log.error( ".perform( ) QueryString contains inv. or msg. params. Analysis NOT performed!" );
                                    //[1]
                                    sbOutput.append( ERRORCODE_INVALID_PARMS ) ;
                        }
                        //[1] end
                        // return output to caller
response.getWriter( ).write( sbOutput.toString( ) ) ;
response.getWriter( ).flush( ) ;
// do not forward anywhere
return null ;
            }
```

APPENDIX A-continued

Embodiment of an Event Processor 165

```
/************************************************************************
 * returnQueryStringDebugInfo
 * this is test/debug code. Simply dumps the passed in parms back out
 * so can be validated by tester with a browser.
 * @param request javax.servlet.http.HttpServletRequest from the HTTP server
 * @param sbOutput StringBuffer that gets returned to the user browser.
 * @return none
 * @exception none
 *///----------------------------------------------------------------------
        private void returnQueryStringDebugInfo( javax.servlet.http.HttpServletRequest request, StringBuffer sbOutput )
{
   sbOutput.append( "HeartbeatValidatorAction.perform( ) has been called with these query string parameters:<br>" ) ;
                Enumeration enumParms = request.getParameterNames( ) ;
String sParmName ;
                while( enumParms.hasMoreElements( ) )
   {
                        sParmName = enumParms.nextElement( ).toString( ) ;
                        sbOutput.append( sParmName + " = " ) ;
                        sbOutput.append( request.getParameter( sParmName ) );
                        sbOutput.append("<br>");
   }
 }

//==========================================================================
        // Event Handlers
        //--------------------------------------------------------------------------
}
```

APPENDIX B

Exemplary Schedule XML Document 198

```
<?xml version="1.0" encoding="UTF-8"?>
-<schedules>
   -<schedule>
      <id>app</id>
      <resolution>0;5;*;*;*</resolution>
      <data />
      <uri>http://isee-configuration.atl.hp.com/
      xpresso/checkHeartbeat.do</uri>
   </schedule>
   -<schedule>
      <id>11</id>
      <resolution>15;5;*;*;*</resolution>
      <data />
      <uri>http://isee-configuration.atl.hp.com/
xpresso/checkHeartbeat.do</uri>
   </schedule>
   -<schedule>
      <id>app</id>
      <resolution>0;23;*;*;*</resolution>
      <data />
      <uri>http://isee-configuration.atl.hp.com/
      xpresso/checkRegistrations.do</uri>
   </schedule>
</schedules>
```

What is claimed is:

1. A method for scheduling and executing a real-time event in a networked environment, the method comprising:

(a) contacting one or more event schedulers;

(b) receiving an event schedule update from the event schedulers;

(c) calculating the time when each event is to occur from information contained in the received scheduling information for each event;

(d) placing event scheduling information contained in the received scheduling information for each event plus the calculated time for that same event into an event queue; and (e) at the time when each event is to occur, as indicated by examination of the calculated times in the event queue, contacting one or more event processors designated by the received scheduling information corresponding to that event and sending an event firing message to the designated event processors, wherein the step (a) is performed periodically and is a request for an update, and wherein the received event scheduling information is formatted as an XML document or its equivalent that includes an event identifier, a resolution value defining when an event is to occur, a designator of at least one event processor, and additional data to be supplied to the at least one designated event processor when an event is to occur.

2. The method according to claim 1, including the additional step of conveying attempts to contact the schedulers through a load balancer and into a farm of machines such that the event requests may originate from machines carrying out intranet or Internet web activities or both.

3. The method according to claim 2, wherein the contacting in step (a) is contacting a schedule document that is updated by one or more event schedulers, and wherein this document is received in step (b).

4. The method according to claim 1, wherein the message transmitted to the event processor is transmitted through a load balancer and into a farm of machines such that the event processors may be installed on machines carrying out intranet or Internet web activities or both.

5. The method according to claim 4, wherein the message is an addressed HTTP or SOAP or equivalently-addressed message including event data, and wherein the address and the event data are both obtained from the event scheduling information for the scheduled event to which the message relates.

6. The method according to claim 1, wherein the event queue is an asynchronous access priority queue, the method further comprising:

automatically performing a resorting of the events stored in the event queue.

7. A system for scheduling and executing a real time event over a network, the system comprising:
   at least one farm of machines sharing a load balancer;
   a cluster of servers arranged to replace each other in case of malfunction, the cluster networked to the farm;
   at least one event processor within the farm of machines able to cause an event to occur in response to a received message;
   at least one event scheduler within the farm of machines able to provide event schedules indicating when one or more events are to occur and the addresses of the event processors that can cause the events to occur;
   an event manager within the cluster that comprises an event queue, an event loader that accepts event schedules from the schedulers and places them into an event queue, and a timekeeper that examines the event queue and, at the time of a scheduled event, transmits a message requesting firing of the event to an event processor whose address is obtained from the corresponding event schedule,
   wherein the event loader requests event schedules from the event schedulers periodically, in which each of the requests for event schedules is a request for an update, and
   wherein the received event schedules are formatted as an XML document or its equivalent that includes an event identifier, a resolution value defining when an event is to occur, a designator of at least one event processor, and additional data to be supplied to the at least one designated event processor when an event is to occur.

8. The system according to claim 7, wherein within the cluster, one server takes over the responsibilities of another server as needed to insure the availability of the event manager at all times.

9. The system according to claim 8, wherein each of the plurality of servers in the cluster comprises a computer having management software that monitors each of the plurality of other servers within the cluster in real-time.

10. The system according to claim 8, wherein at least one of the plurality of servers is continuously operating the event manager at any given time, and wherein in case of difficulties another of the plurality of servers takes over operating the event manager such that the servers back each other up.

11. The system according to claim 7, wherein the event loader accepts event schedules from the event schedulers which are presented to the event loader by the event schedulers.

12. The system according to claim 7, wherein the event schedules are documents or their equivalent posted and updated by the event schedulers so that they may be addressed directly and retrieved directly by the event manager at any time.

13. The system according to claim 7, wherein the event manager is multi-threaded, with the threads coordinating their activities about shared access to the event queue, the event loader comprising a first thread, and the timekeeper comprising a second thread,
   wherein the first and second threads are executed asynchronously with respect to each other.

14. The system according to claim 13, wherein the event manager further comprises a request queue containing requests for the firing of events placed there by the timekeeper, and wherein the timekeeper further comprises a communicator comprising a third thread that coordinates its activities with the timekeeper second thread about shared access to the request queue and that checks the request queue and retrieves requests for the firing of events from the request queue and then generates the messages that are sent to the event processors when such requests appear in the request queue.

15. The system according to claim 7, wherein the event manager further comprises a record queue associated with the timekeeper having an associated communications program, the timekeeper placing requests for the transmission of event messages into the request queue, and the communications program retrieving those requests, sending out the messages to the event processors, and confirming that the messages are actually received by the event processors or taking corrective actions if they are not received, whereby delays in message transmission and receipt do not slow down the scheduling and the processing of other events.

16. The system according to claim 7, wherein the event manager additionally comprises an event data structure which comprises information taken from a corresponding event schedule plus a computed time of the next occurrence of a corresponding event, and wherein the event queue is structured to accept and to manage such event data structures for multiple scheduled events.

17. The system according to claim 16, wherein the event queue is structured as an object which maintains event data structures organized such that the next event to occur is positioned within the queue to a position immediately accessible to the timekeeper.

18. The system according to claim 7, wherein the event manager contacts the event schedulers to accept information from them via HTTP links or their equivalent.

19. The system according to claim 7, wherein the event queue is an asynchronous access priority queue, and wherein the events stored within the event queue are automatically resorted.

20. A computer readable medium storing a computer program product having program code that is executable by a computer for scheduling and executing real-time events in a networked environment, the program code configured to cause the computer to perform the method comprising:
   (a) contacting one or more event schedulers;
   (b) receiving an event schedule update from the event schedulers;
   (c) calculating the time when each event is to occur from information contained in the received scheduling information for each event;
   (d) placing event scheduling information contained in the received scheduling information for each event plus the calculated time for that same event into an event queue; and
   (e) at the time when each event is to occur, as indicated by examination of the calculated times in the event queue, contacting one or more event processors designated by the received scheduling information corresponding to that event and sending an event firing message to the designated event processors,
   wherein the step (a) is performed periodically and is a request for an update, and
   wherein the received event scheduling information is formatted as an XML document or its equivalent that includes an event identifier, a resolution value defining when an event is to occur, a designator of at least one event processor, and additional data to be supplied to the at least one designated event processor when an event is to occur.

21. The computer readable medium according to claim 20, including the additional step of conveying attempts to contact the schedulers through a load balancer and into a farm of machines such that the event requests may originate from machines carrying out intranet or Internet web activities or both.

22. The computer readable medium according to claim 21, wherein the contacting in step (a) is contacting a schedule document that is updated by one or more event schedulers, and wherein this document is received in step (b).

23. The computer readable medium according to claim 20, wherein the message transmitted to the event processor is transmitted through a load balancer and into a farm of machines such that the event processors may be installed on machines carrying out intranet or Internet web activities or both.

24. The computer readable medium according to claim 23, wherein the message is an addressed HTTP or SOAP or equivalently-addressed message including event data, and wherein the address and the event data are both obtained from the event scheduling information for the scheduled event to which the message relates.

25. An apparatus for scheduling and executing real-time events over a network comprising:

event management means for receiving event schedule updates from a networked environment, said event management means comprising:

calculation means for calculating the time when each event is to occur from information contained in the most recently received event schedule update for each event;

event queue synchronizing means for establishing an event queue, for placing information taken from incoming event schedule updates and the calculated times of event occurrence into the event queue, and for synchronizing the contents of the event queue with later-arriving event schedule updates when they are received; and communicating means for sending out an event firing message to a network address designated by the most recently received event scheduling update information corresponding to an event at the time when that event is scheduled to occur, as indicated by examination of the calculated time of occurrence for that event contained within the event queue, wherein the event management means receives event schedule updates received by the event management means includes event cancellation information for one or more events, and wherein the one or more events to be canceled are provided with information in the event queue by the event queue synchronization means to designate the one or more events to be canceled as zero schedule events, to be distinguished from other events in the event queue that are not to be canceled, wherein the zero schedule events do not result in respective event firing messages being sent out by the communication means, wherein the event management means reguests event schedule updates periodically, and wherein the received event schedule updates are formatted as an XML document or its eguivalent that includes an event identifier, a resolution value defining when an event is to occur, a designator of at least one event processor, and additional data to be supplied to the at least one designated event processor when an event is to occur.

* * * * *

UNITED STATES PATENT AND TRADEMARK OFFICE
CERTIFICATE OF CORRECTION

| | |
|---|---|
| PATENT NO. | : 7,376,733 B2 |
| APPLICATION NO. | : 10/357092 |
| DATED | : May 20, 2008 |
| INVENTOR(S) | : Jon Christopher Connelly et al. |

Page 1 of 1

It is certified that error appears in the above-identified patent and that said Letters Patent is hereby corrected as shown below:

In column 18, line 24, in Claim 25, delete "reguests" and insert -- requests --, therefor.

In column 18, line 27, in Claim 25, delete "eguivalent" and insert -- equivalent --, therefor.

Signed and Sealed this

Twenty-ninth Day of July, 2008

JON W. DUDAS
*Director of the United States Patent and Trademark Office*